J. S. HAGERTY.
STREET-LAMP.
No. 7,568. Reissued March 27, 1877.
FIG. I
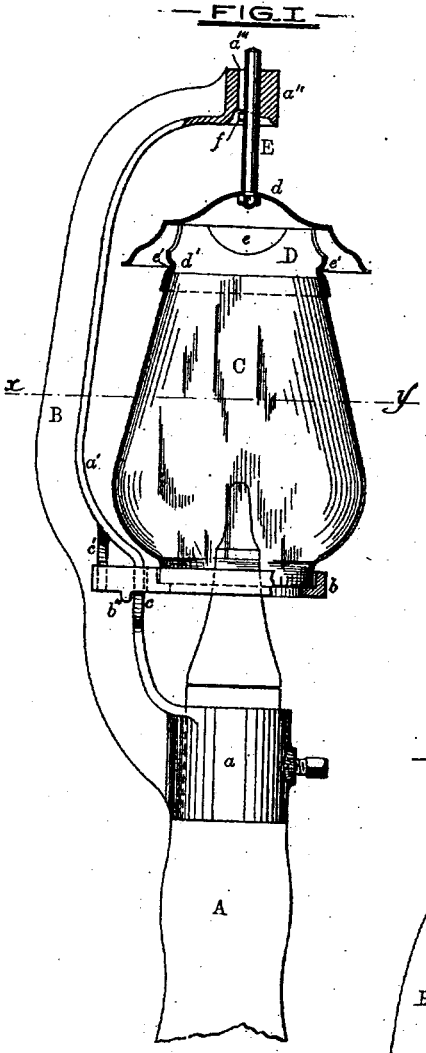
FIG. II
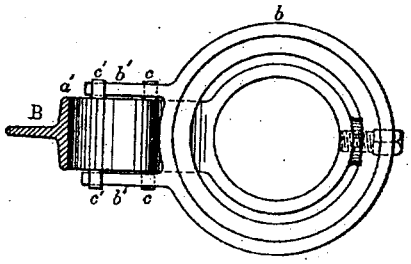
FIG. III
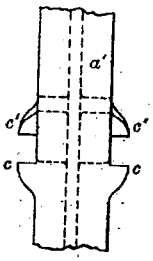
FIG. IV
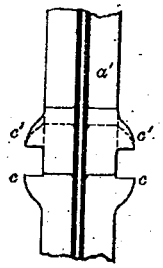
FIG. V
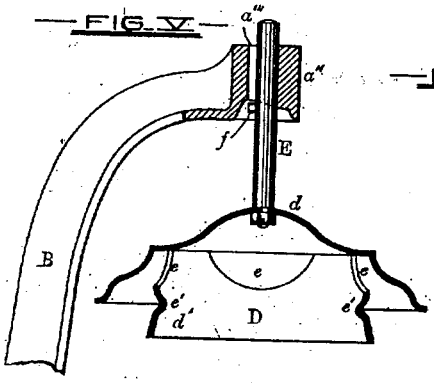
FIG. VI
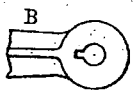
WITNESSES.
Wm. H. Dawson
W. W. Wharton
INVENTOR.
James S. Hagerty
by Geo. W. Hoyt
Atty.
N. PETERS, PHOTO-LITHOGRAPHER, WASHINGTON, D. C.

UNITED STATES PATENT OFFICE

JAMES S. HAGERTY, OF BALTIMORE, MARYLAND.

IMPROVEMENT IN STREET-LAMPS.

Specification forming part of Letters Patent No. 142,693, dated September 9, 1873; reissue No. 7,568, dated March 27, 1877; application filed March 15, 1876.

*To all whom it may concern:*

Be it known that I, JAMES S. HAGERTY, of the city of Baltimore and State of Maryland, have invented certain Improvements in Street-Lamps, of which the following is a specification, reference being had to the accompanying drawing, forming a part hereof.

This invention is specially adapted to that class of street-lamps in which the glass portion consists of what is generally termed a "globe," though practically cylindrical in shape, instead of being formed in panes or plates, as in street-lamps of earlier construction.

The use of a globe for this purpose, instead of the ordinary glass frames and plates as a cover for the light, allows much more light to be radiated from the lamp, as the practically-closed bottom of the old lantern, together with the frames thereof, cast a greatly-magnified shadow upon the pavement and into the street, which is materially avoided by the use of the class of lamps which it is the design of my invention to improve. In these, however, much of the light has been prevented from emanating from the lamp by various obstructions found in the construction of the support for the lamp-globe, and in the frame-work embracing the same.

One object of my invention, therefore, is to support the lamp-globe in a manner which will obstruct as little as possible the light radiated from the flame.

Another object of my invention is to secure the globe to the support so as to facilitate its removal therefrom for the purpose of cleaning or renewal, and in a manner which prevents its being jarred out of position or rendered loose upon its seat or within other inclosing parts of the supporting devices.

Another object of my invention is to obtain a construction of certain parts of the supports adapting them to be fitted together cheaply and expeditiously, without any other means of attachment than are found in the parts so fitted together.

In order to fully understand the means employed in carrying out the different objects of my invention, reference is directed to the accompanying drawing, forming a part of this specification.

In the said drawing, Figure 1 is a side elevation, partly in section, of a street-lamp embodying my improvements, and of a portion of the lamp-post, showing the mode of attachment. Figs. 2, 3, 4, 5, and 6 show views of detached portions of the invention, as hereinafter fully described.

Similar letters of reference indicate similar parts of the invention in all the views.

A is the lamp-post, the upper part of which receives the socket *a* of the lamp-globe-supporting arm B. The arm B, extending upward, has a curvature substantially that of the swell of the lamp-globe C, and terminates above the globe in and at the common vertical center line of the lamp post, burner, and globe, as shown. The base of the globe C rests on and in the base-ring *b*, which stands in a horizontal position with respect to the vertical center line of the lamp, and is attached to the arm B by the co-operation of certain projections cast on the arm and ring, without other means of fastening. By referring to Fig. 2, which is an enlarged transverse section on line *x y* of Fig. 1, the globe not being shown, it will be seen that the base-ring *b* is provided with straight and parallel extensions *b'*, somewhat wider apart than the width of the flange *a'* of the arm B. It will also be seen that the flange *a'* of the arm B has cast upon it lugs or projections *c*, which have their bearing-surfaces up, and other lugs or projections, *c'*, which face downward. The under part of each extension *b'* is provided with a stop, *b''*.

In attaching and locking together the arm B and base-ring *b*, the following is the mode of procedure and the effect: The base-ring *b* is held in an oblique plane in front of the arm B, and pushed forward until the stops *b''* have passed the lugs or projections *c*, when it is permitted to assume a horizontal position, the extensions *b'* coming in contact with the lugs or projections *c'*. The arm and base-ring are thus locked together, and the latter prevented from moving laterally by means of the extensions *b'*, and from having a downward motion by means of the lugs *c* and *c'*. Movement toward the arm B is prevented by the contact of that part of the base-ring between the extensions *b'* with the flange *a'* of the arm B, and motion from the arm is prevented by the contact of the stops $b''$ with the lugs $c$. Thus a fastening is made which is easily detached, and in which are employed no securing devices additional to those found in the parts thus connected. Cheapness and facility of construction and transportation are thereby accomplished. Figs. 3 and 4 are, respectively, enlarged front and rear views of that part of the arm B to which the base-ring $b$ is secured.

The base-ring $b$ is formed with a recess or depression, in which the globe C rests, the lamp-burner passing up through the ring into the globe, as shown.

The top of the globe C rests within a cap, D, which can be slid up from, or down upon, the globe. The cap D consists of an outer dome, $d$, and an inner annular inclosure, $d'$, for the top of the globe. The inner part $d'$ is lightened by portions thereof being removed, as shown at $e$, and may have a corrugation, $e'$, to strengthen it, and of such diameter as to enable it to fit neatly over the top edge of the globe. From the top of the dome $d$ projects a fixed or detachable rod, E, which extends up into and through a socket, $a''$, of the lamp-globe-supporting arm B. Fig. 5 shows, on an enlarged scale and in section, the cap D and appendages, with its attachment to the arm B. The socket $a''$ is provided with a slot, $a'''$, communicating with the central hole, and is also provided with an under concave surface having an inclined part, as shown. The rod E is furnished with a feather or pin, $f$.

In adjusting the globe to and from the supports provided for it the following is the mode of operation: The base-ring $b$ having been put in position, as hereinbefore described, and the cap D raised, the globe C is placed upon and within the base-ring. The cap is then allowed to descend upon the upper edge of the globe, the feather or pin $f$ being turned to, and caused to slide within, the slot $a'''$ of the socket $a''$. When the cap has rested upon the globe the feather $f$ is turned against the inclined under face of the socket, and the cap tightened on the globe. During the time when the globe is being placed and adjusted on its seat the cap hangs from the socket $a''$, the feather $f$ being turned from the slot $a'''$.

Having thus described my invention, what I claim as new, and wish to secure by Letters Patent of the United States, is—

1. A lamp-globe-supporting arm, a cap constructed to fit over the lamp-globe, and a sliding connection between the cap and arm, combined substantially as described.

2. A street-lamp globe-support, consisting of a vertical supporting-arm, a globe base-ring, a globe-cap, and a sliding connection between the cap and arm, combined substantially in the manner shown and described, whereby the globe is removably held between the base-ring and cap, and the said cap may be slid from the globe and seated upon the same, for the purposes specified.

3. A lamp-globe-supporting arm combined with a sliding connection for holding the globe-cap the said arm and sliding connection being constructed to interlock and fasten the cap firmly and steadily upon the globe, substantially as specified.

4. In combination with a street-lamp, a sliding cap adapted to be slid to and from the globe, substantially as and for the purposes described.

5. A lamp-globe-supporting arm combined with a globe base-ring, the said arm and base-ring being provided with co-operating lugs or projections, whereby the base-ring is connected to the arm in a horizontal position without other attachment, substantially as and for the purposes specified.

6. In a street-lamp, a single supporting-arm sustaining the upper and lower holders or inclosures of the globe, and extending below the said lower holder as a means of attachment to the lamp-post, substantially as herein described.

7. In a street-lamp, a globe-cap combined with a sliding sustaining-rod, substantially as set forth.

8. In combination with the sliding cap and rod of a street-lamp, a slotted socket to receive the said rod, and a feather or pin for guiding and steadying the union of the rod and socket, substantially as specified.

9. A detachable base-ring for supporting a street-lamp globe, combined with a lamp-globe-supporting arm, whereby cheapness and facility in manufacture and transportation are accomplished.

In testimony whereof I have hereunto subscribed my name this 6th day of January, in the year of our Lord 1877.

JAS. S. HAGERTY.

Witnesses:

TH. HARRIS HODGES,
CHAS. D. BOYD.